United States Patent
Curt et al.

(10) Patent No.: US 8,764,984 B2
(45) Date of Patent: Jul. 1, 2014

(54) FILTER-IN-FILTER WITH FUNNEL SHAPED PASSAGEWAY

(75) Inventors: Carey A. Curt, Cookeville, TN (US);
Chad M. Thomas, Cookeville, TN (US);
Mark J. Johnson, Cookeville, TN (US);
Stephen L. Fallon, Oregon, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 253 days.

(21) Appl. No.: 13/449,793

(22) Filed: Apr. 18, 2012

(65) Prior Publication Data

US 2012/0261355 A1 Oct. 18, 2012

Related U.S. Application Data

(60) Provisional application No. 61/476,434, filed on Apr. 18, 2011.

(51) Int. Cl.
*B01D 35/30* (2006.01)
*F02M 37/22* (2006.01)
*B01D 27/14* (2006.01)
*B01D 29/50* (2006.01)
*B01D 36/02* (2006.01)

(52) U.S. Cl.
USPC ........... 210/342; 210/767; 210/232; 210/248; 210/315; 210/323.1; 210/323.2; 210/541

(58) Field of Classification Search
CPC ...... B01D 27/08; B01D 27/14; B01D 27/144; B01D 27/148; B01D 29/50; B01D 29/54; B01D 29/58; B01D 35/30; B01D 35/306
See application file for complete search history.

(56) References Cited

U.S. PATENT DOCUMENTS

| | | | |
|---|---|---|---|
| 6,939,464 B1 | 9/2005 | Jiang et al. | |
| 7,163,003 B2 * | 1/2007 | Bradford | 123/510 |
| 7,189,197 B2 | 3/2007 | Curt et al. | |
| 8,216,470 B2 | 7/2012 | Abdalla et al. | |
| 2006/0191832 A1 * | 8/2006 | Richie et al. | 210/171 |
| 2007/0137155 A1 | 6/2007 | Furseth et al. | |
| 2007/0271885 A1 | 11/2007 | Rieger et al. | |
| 2007/0289915 A1 | 12/2007 | Jiang et al. | |
| 2008/0099388 A1 * | 5/2008 | Frost | 210/167.04 |
| 2009/0020465 A1 | 1/2009 | Jiang et al. | |
| 2009/0308801 A1 | 12/2009 | Beard et al. | |

OTHER PUBLICATIONS

International Search Report for international application No. PCT/US2012/034037, dated Nov. 30, 2012 (4 pages).
Written Opinion for international application No. PCT/US2012/034037, dated Nov. 30, 2012 (6 pages).

* cited by examiner

*Primary Examiner* — Benjamin Kurtz
(74) *Attorney, Agent, or Firm* — Foley & Lardner LLP (57) ABSTRACT

A parallel flow filter-in-filter design for a filter system is provided. The filter-in-filter design provides two distinctly parallel or independent flow paths within a filter assembly in a single housing or shell. The filter assembly includes a first outer filter element radially spaced apart from a second inner filter element. A centertube and a funnel shaped passageway housed within the centertube are provided in a space between the first outer filter element and the second inner filter element. The centertube and funnel shaped passageway work in tandem to provide two distinct parallel or independent flow paths within the filter assembly. The funnel shaped passageway is provided generally below the second inner filter element within the centertube.

18 Claims, 8 Drawing Sheets

FILTER-IN-FILTER WITH FUNNEL SHAPED PASSAGEWAY

PRIORITY

This application claims the benefit of U.S. Provisional Application No. 61/476,434, entitled "FILTER-IN-FILTER WITH FUNNEL SHAPED PASSAGEWAY", filed Apr. 18, 2011, and which is incorporated herein by reference in its entirety.

FIELD

This disclosure relates to the field of fluid filters. More particularly, this description relates to a filter-in-filter with a funnel shaped passageway.

BACKGROUND

Filter-in-filter designs for fluid filters are known. Typical filter-in-filter designs provide a fluid flow path in which a fluid enters the fluid filter housing and then proceeds to pass through a first filter element and then through a second filter element in series before exiting the filter housing.

SUMMARY

The embodiments provided herein are to an improved filter-in-filter design for fluid filters. Particularly, the embodiments described herein provide a filter-in-filter design in which two parallel or independent flow paths are included within a filter assembly in a single housing or shell. This allows the filter assembly to provide parallel filter flows (e.g. a full filter flow and a bypass filter flow) and multiple fluid filter types (e.g. fuel filters, lube filters, etc.) within the same housing or shell. This provides a unique interface in which multiple filter types requiring independent or parallel flow paths can be included within the same housing or shell. Also, the amount of space required for the fluid filters within a fuel system can be reduced.

In particular, the embodiments provided herein include a centertube and a funnel shaped passageway housed within the centertube that work in tandem to provide two parallel or independent flow paths within a filter assembly. The centertube is provided between a first outer filter element and a second inner filter element. The funnel shaped passageway is provided generally below the second inner filter element within the centertube.

The centertube includes a generally solid top section and a bottom section that includes a plurality of flow passages. The flow passages are provided below the location where the funnel shaped passageway attaches to the interior of the centertube and allow a first fluid travelling through a first flow path from passing through the first outer filter element to pass through the centertube without contacting a second fluid passing through the second inner filter element. In some embodiments, the centertube is configured to provide heat transfer between fluid passing through the first outer element and fluid passing through the second inner filter element.

The funnel shaped passageway provides a central passage and a plurality of perimeter passages that allows the second fluid travelling through a second flow path to pass through the second inner filter within the centertube without contacting the first fluid passing through the centertube.

A first seal member is provided where the centertube is removably attached to a top end of a shell that houses the filter assembly. A second seal member is also provided where the funnel shaped passageway is attached to the interior of the centertube. The first and second seal members are provided to separate the first flow path from the second flow path and to prevent the first fluid from coming into contact with the second fluid within the filter assembly.

In some embodiments, the centertube is configured to provide heat transfer between fluid passing through the first outer element and fluid passing through the second inner filter element.

In some embodiments, thread fittings having different thread pitches (e.g. a fine thread pitch, a buttress thread pitch, etc.) are used for connecting different components of the filter-in-filter design. For example, in one embodiment, a centertube is attached to a top end of a shell using a thread fitting having a first thread pitch, while the centertube is attached to a funnel shaped passageway using a thread fitting having a second thread pitch. In another embodiment, a filter cartridge is attached to a shell using a thread fitting having a first thread pitch, while the shell is attached to a filter system using a thread fitting having a second thread pitch.

In one embodiment, a centertube and funnel drain combination for use in a filter-in-filter fluid filter assembly is provided. The centertube and funnel drain combination includes a centertube configured to be positioned between an outer filter element and an inner filter element of a filter-in-filter fluid filter assembly. The centertube includes a cylindrical side wall and first and second open ends at opposite ends of the cylindrical side wall. The cylindrical side wall includes a solid top section configured to extend along a length of the inner filter element and a bottom section adjacent the second open end that includes a plurality of centertube flow passages. The solid top section is formed without openings to prevent fluid communication between the outer filter element and the inner filter element. The centertube and funnel drain combination also includes a funnel drain attached to the centertube above the bottom section. The funnel drain includes a central flow passage configured to allow a first fluid to pass through the funnel drain and a plurality of perimeter funnel flow passages configured to allow a second fluid to pass through the funnel drain without contacting the first fluid.

In another embodiment, a filter-in-filter fluid filter cartridge is provided. The filter-in-filter fluid filter cartridge includes a first filter element, a second filter element radially spaced apart from the first filter element, a centertube and a funnel passageway. The centertube is positioned between the first filter element and the second filter element. Also, the centertube has a cylindrical side wall and first and second open ends at opposite ends of the cylindrical side wall. The cylindrical side wall includes a solid top portion that extends along a length of the second filter element and a bottom portion that includes a plurality of centertube flow passages that is adjacent the second open end and generally below the second filter element. The solid top portion is formed without openings to prevent fluid communication between the first filter element and the second filter element. The funnel passageway is attached to an interior surface of the cylindrical side wall of the centertube above the bottom portion. The funnel passageway includes a central flow passage and a plurality of perimeter funnel flow passages fluidly isolated from the central flow passage. A first fluid is configured to pass through the first filter element and the centertube flow passages and the second fluid is configured to pass through the second filter element, the central passageway and the perimeter funnel flow passages without contacting the first fluid.

In a further embodiment, a centertube configured to be positioned between an outer filter element and an inner filter element of a filter-in-filter fluid filter cartridge is provided. The centertube includes a cylindrical side wall and first and second openings at opposite ends of the cylindrical side wall. The cylindrical side wall includes a solid top section configured to extend along a length of the inner filter element and a bottom section adjacent the second opening that includes a plurality of centertube flow passages. The solid top section is formed without openings to prevent fluid communication between the outer filter element and the inner filter element.

In yet another embodiment, a funnel drain configured to be positioned between an outer filter element and an inner filter element of a filter-in-filter fluid filter cartridge is provided. The funnel drain includes a central flow passage configured to allow a first fluid to pass through the funnel drain. The funnel drain also includes a plurality of perimeter funnel flow passages configured to be fluidly isolated from the central flow passage so as to allow a second fluid to pass through the funnel drain without contacting the first fluid.

Also, in another embodiment, a method for filtering a first fluid and a second fluid through independent flow paths of a filter-in-filter fluid filter cartridge such that the first fluid and the second fluid are not in fluid communication is also provided. The method includes directing the first fluid through an outer filter element, a plurality of centertube flow passages on a cylindrical side wall of a centertube positioned between the outer filter element and an inner filter element radially spaced apart from the inner filter element. The method also includes directing the second fluid through an inner filter element, a central flow passage of a funnel drain attached to a bottom section of the cylindrical side wall, and a perimeter flow passage of the funnel drain that is fluidly isolated from the central flow passage.

DETAILED DESCRIPTION

The following description generally provides an improved filter-in-filter design for fluid filters. Particularly, the embodiments described herein provide a filter-in-filter design in which two parallel or independent flow paths are included within a filter assembly in a single housing. This allows the filter assembly to provide parallel filter flows (e.g. a full filter flow and a bypass filter flow) and multiple fluid filter types (e.g. fuel filters, lube filters, etc.) within the same housing or shell.

In particular, the embodiments provided herein include a centertube and a funnel shaped passageway housed within the centertube that work in tandem to provide two parallel or independent flow paths within a filter assembly. The centertube is provided between a first outer filter element and a second inner filter element. The funnel shaped passageway is provided generally below the second inner filter element within the centertube.

The centertube includes a generally solid top section and a bottom section that includes a plurality of flow passages. The flow passages are provided below the location where the funnel shaped passageway attaches to the interior of the centertube and allow a first fluid travelling through a first flow path from passing through the first outer filter element to pass through the centertube without contacting a second fluid passing through the second inner filter element.

The funnel shaped passageway provides a central passage and a plurality of perimeter passages that allows the second fluid travelling through a second flow path to pass through the second inner filter within the centertube without contacting the first fluid passing through the centertube.

A first seal member is provided where the centertube is removably attached to a top end of a shell that houses the filter assembly. A second seal member is also provided where the funnel shaped passageway is attached to the interior of the centertube. The first and second seal members are provided to separate the first flow path from the second flow path and to prevent the first fluid from coming into contact with the second fluid within the filter assembly.

Figure 1:
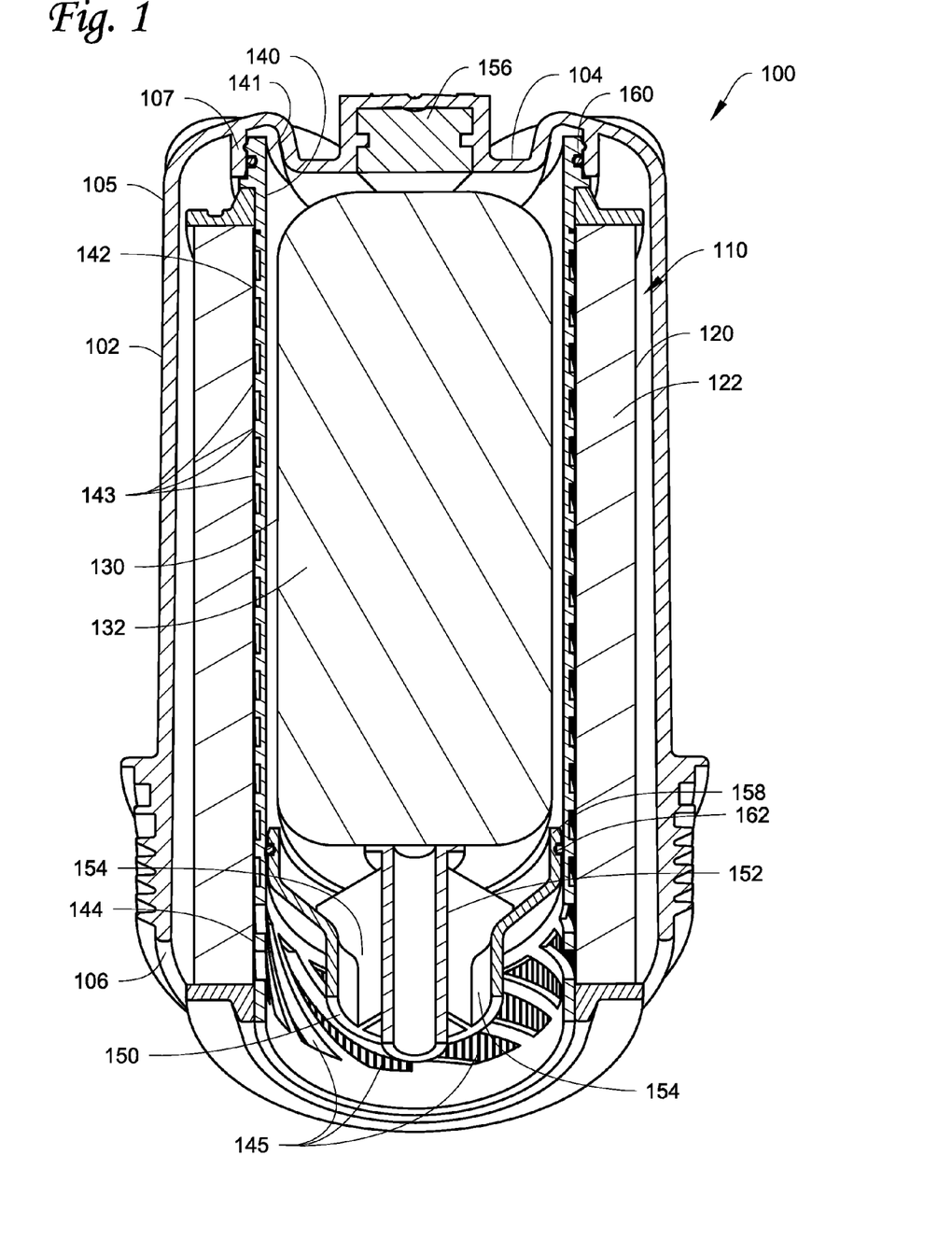
FIG. 1 illustrates a cross-sectional perspective view of a portion of a parallel flow filter-in-filter assembly, according to one embodiment.

FIG. 1 illustrates a cross-sectional perspective view of a portion of a parallel flow filter-in-filter assembly 100, according to a one embodiment. The assembly 100 includes a generally cylindrical housing or shell 105 for housing a replaceable parallel flow filter-in-filter filter cartridge 110. The shell 105 has a generally cylindrical wall 102, a closed top end 104 (e.g. lid portion) and an open bottom end 106 for attaching the assembly 100 to, for example, a filter system (not shown). While the shell 105 and the wall 102 are generally cylindrically shaped, in other embodiments the shell 105 and the wall 102 are formed in other shapes.

The filter cartridge 110 includes a first outer filter element 120 radially spaced apart from a second inner filter element 130. The filter cartridge 110 also includes a centertube 140 and a funnel shaped passageway 150. The centertube 140 is provided between the first outer filter element 120 and the second inner filter element 130. The funnel shaped passageway 150 is disposed within the centertube 140 and generally below the second inner filter element 130. In some embodiments, the filter cartridge 110 is a single change filter cartridge in which the entire filter cartridge 110 (including the first outer filter element 120, the second inner filter element 130, the centertube 140 and the funnel shaped passageway 150) is replaceable as a single unit within the filter assembly 100. In other embodiments, the filter cartridge 110 is not a single replaceable filter cartridge and the first outer filter element 120 and the second inner filter element 130 can be replaced independently without having to replace the entire filter cartridge 110.

The filter cartridge 110 can include multiple fluid filter types including, for example, a fuel filter, a lube filter, etc. In FIG. 1, the first outer filter element 120 is a fuel filter type that includes a fuel filter media 122. The fuel filter media can be any type of filter media including, for example, a depth filter media, a pleated filter media, a multi-layer filter media, a combined cleaning unit (CCU) drain assembly, etc. The second inner filter element 130 is a fluid filter type that includes a centrifuge 132. However, in other embodiments, the second inner filter element 130 can be a fuel filter type that includes a fuel filter media such as a depth filter media, a pleated filter media, a multi-layer filter media, a stacked disk type filter media, a CCU drain assembly, etc.

The centertube 140 is provided to radially separate the first outer filter element 120 from the second inner filter element 130. The centertube 140 is attached to the top end 104 of the shell 105 and extends through the opening 106 of the shell 105. As shown in FIG. 1, the top end 104 of the shell 105 includes an annular protrusion 107 for removably attaching a top connection portion 141 of the centertube 140 to the shell 105. In particular, the top connection portion 141 and the annular protrusion 107 each include a thread fitting (not shown) for allowing that centertube 140 to screw onto the top end 104 of the shell 105. The thread fitting can use, for example, a fine thread pitch, a buttress thread pitch, etc. In some embodiments, the centertube 140 is configured to provide heat transfer between a first fluid (not shown) passing through the first outer element 120 and a second fluid (not shown) passing through the second inner filter element 130.

In other embodiments, the centertube 140 is connected to the shell 105 using a radial seal press fit. In yet some other embodiments, the centertube 140 is permanently joined to the shell 105 via a plastic joint using, for example, a spin welding or sonic welding process.

A first seal member 160 is provided between the annular protrusion 107 and the top connection portion 141 of the centertube 140 to separate fluid passing through the first outer filter element 120 and fluid passing through second inner filter element 130. In some embodiments, the first seal member 160 is a gasket such as an O-ring. In other embodiments, the first seal member 160 can be, for example, a plastic-to-plastic seal joint, a threaded joint, a combination of a threaded joint and a compressed gasket, etc.

The centertube 140 includes a top section 142 and a bottom section 144. The bottom section 144 includes a plurality of flow passages 145. The flow passages 145 are formed as downwardly spiraling slots. In other embodiments, the flow passages 145 can be formed in other shapes such as, for example, vertical slots, horizontal slots, circular openings, etc. The flow passages 145 allow fluid to pass only through the bottom section 144 of the centertube 140.

The centertube 140 also includes a plurality of downwardly spiraling exterior ridges 143 that hold off the first outer filter element 120 from the centertube 140. The ridges 143 are angled to reduce the surface area of the first outer filter element 120 that contacts the centertube 140.

A drain funnel 150 is provided within the centertube 140. The funnel shaped passageway 150 includes a central flow passage 152 and a plurality of perimeter flow passages 154. As described in more detail below, in the embodiment shown in FIG. 1, the central flow passage 152 allows a fluid to enter the top section 142 of the centertube 140 in order to pass through the second inner filter element 130. The plurality of perimeter flow passages 154 allows fluid to exit the top section of the centertube 140 and out of the filter cartridge 110. In other embodiments, the perimeter flow passages 154 allow a fluid to enter the top section 142 of the centertube 140 and the central flow passage 152 allows a fluid to exit out of the top section 142 and out of the filter cartridge 110.

The funnel shaped passageway 150 also includes a top connection portion 158 that is configured to attach to the interior of the centertube 140 at a bottom of the top section 142. In the embodiment shown in FIG. 1, the funnel shaped passageway 150 is press fit into the centertube 140 such that the top connection portion 158 is disposed at a bottom of the top section 142. In other embodiments, the top connection portion 158 and a portion of the top section 142 each include a thread fitting (not shown) for allowing that funnel shaped passageway 150 screw onto the interior of the centertube 140. The thread fitting can use, for example, a fine thread pitch, a buttress pitch, etc. In yet some other embodiments, the funnel shaped passageway 150 is attached to the centertube 140 using a spin welding or sonic welding process.

A second seal member 162 is provided between the top connection portion 158 of the funnel shaped passageway 150 and the interior of the centertube 140 near the bottom of the top section 142 to separate fluid passing through the first outer filter element 120 and fluid passing through second inner filter element 130. In some embodiments, the second seal member 162 is a gasket such as an O-ring. In other embodiments, the second seal member 162 can be, for example, a rubber or plastic wiper seal.

The filter assembly 100 also includes a shaft (not shown) that passes through the center of the shell 105 and the second filter element 130. A top insert 156 is attached to the shaft and is used to secure the top end 104 to the shaft. In some embodiments, the shaft is used to secure the entire top end 104 to the assembly 100. Also, when the second inner filter element 130 includes a centrifuge, the shaft acts as an axis that allows the centrifuge to spin. In some embodiments, the shaft is a single segment shaft. In other embodiments, the shaft is a multiple segment slip fit shaft. Also, in some embodiments, the shaft is replaced with a shaft (not shown) that is provided outside the shell 105.

Figure 2A:
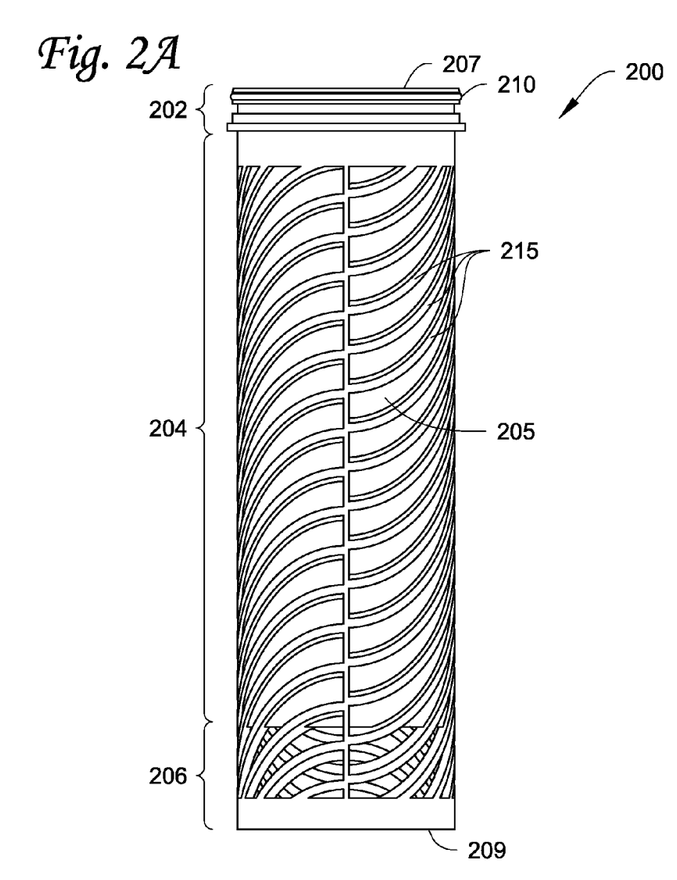
FIG. 2A illustrates a side view of a centertube, according to one embodiment.
Figure 2B:
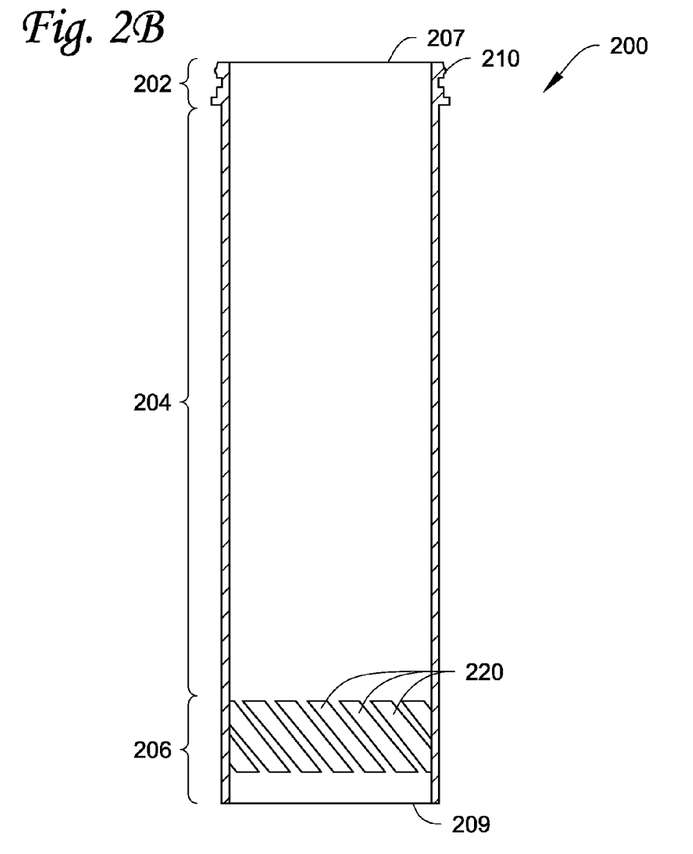
FIG. 2B illustrates a cross-sectional side view of a centertube, according to one embodiment.

FIGS. 2A and 2B provide a side view and a cross-sectional side view of a centertube 200, according to one embodiment. The centertube 200 includes a top connection portion 202, a top section 204 and a bottom section 206. The centertube 200 includes a generally open top end 207 and a generally open bottom end 209. The top connection portion includes a thread fitting 210 that allows the centertube 200 to attach to a housing (such as shell 105 shown in FIG. 1). The thread fitting 210 can use, for example, a fine thread pitch, a buttress thread pitch, etc.

As shown in FIG. 2A, a plurality of downwardly spiraling ridges 215 are provided on an exterior surface 205 of the centertube 200 along both the top section 204 and the bottom section 206. The spiraling ridges 215 hold off an outer filter element (such as the first outer filter element 120 in FIG. 1) that surrounds the centertube 200. The ridges 215 are angled to reduce the amount of surface area of the outer filter element that contacts the centertube 200. In other embodiments, the ridges can have different shapes, including vertical ridges that run along a vertical axis of the centertube 200 or horizontal ridges that run along horizontal axes of the centertube 200.

As shown in FIG. 2B, the top section 204 of the centertube 200 is generally solid and does not contain any openings. The bottom section 206 includes a plurality of flow passages 220. The flow passages 220 are formed as downwardly spiraling slots. In other embodiments, the flow passages 220 can be formed in other shapes such as, for example, vertical slots, horizontal slots, circular openings, etc.

Figure 3A:
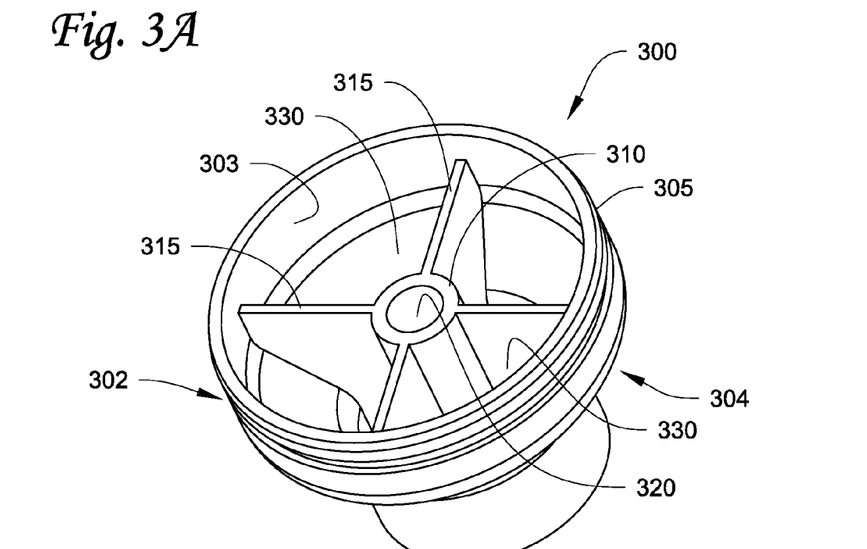
FIG. 3A illustrates a perspective view of a funnel shaped passageway, according to one embodiment.
Figure 3B:
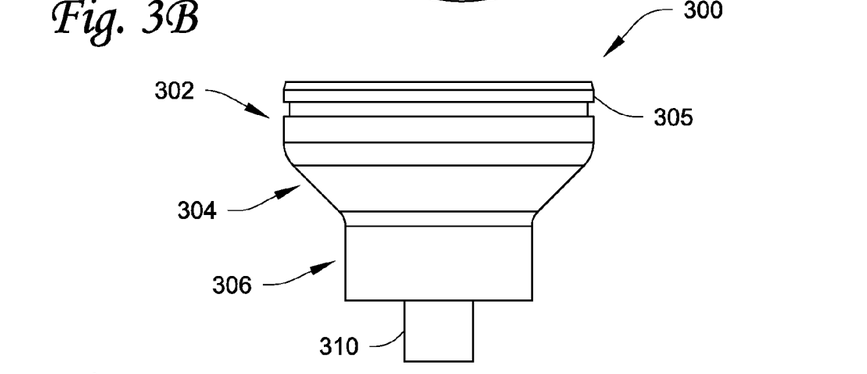
FIG. 3B illustrates a side view of a funnel shaped passageway, according to one embodiment.
Figure 3C:
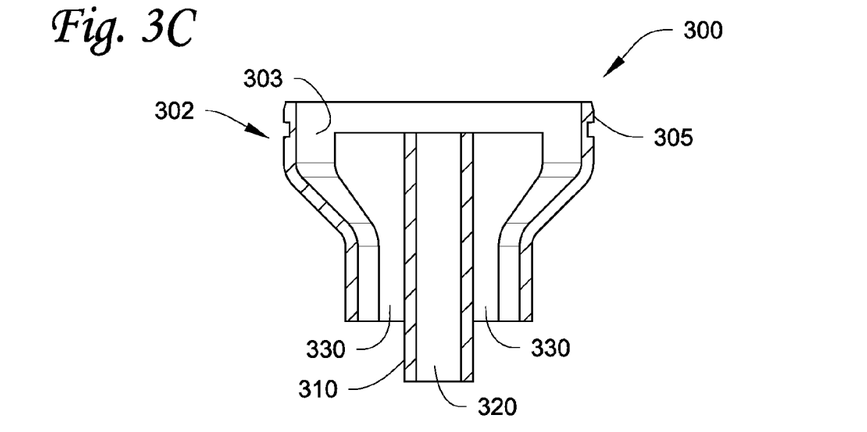
FIG. 3C illustrates a cross-sectional side view of a funnel shaped passageway, according to one embodiment.

FIGS. 3A-3C provide different views of a funnel shaped passageway 300 according to one embodiment. The funnel shaped passageway 300 includes a top connection portion 302, a middle portion 304 and a lower portion 306. The top connection portion 302 is configured to attach to an interior of a centertube (such as centertube 140 shown in FIG. 1). The top connection portion 302 includes a thread fitting 305 for allowing that funnel shaped passageway 300 to screw onto an interior of a centertube. The thread fitting 305 can use, for example, a fine thread pitch, a buttress thread pitch, etc.

As shown in FIG. 3A, the funnel shaped passageway 300 includes a central tube portion 310 that extends from the top connection portion 302 down through the lower portion 306. A plurality of side plates 315 (e.g. ribs) extend from the central tube portion 310 to an interior wall 303 of the funnel shaped passageway 300 to secure the central tube portion 310 to the interior wall 303.

As shown in FIGS. 3A and 3C, the central tube portion 310 is open at both ends to form a central flow passage 320 for fluid to pass through funnel shaped passageway 300. Also, the plurality of side plates 315 are shaped to form a plurality of perimeter flow passages 330 for fluid to pass through the funnel shaped passageway 300 without contacting fluid passing through the central flow passage 320.

Figure 4A:
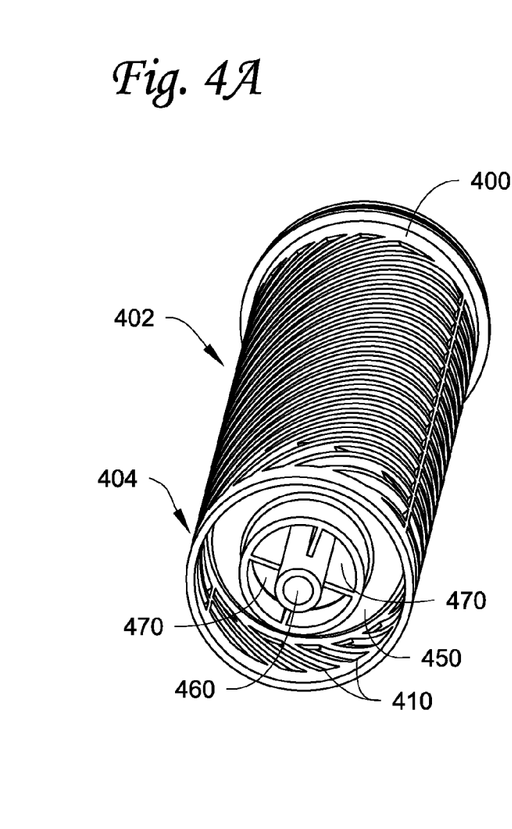
FIG. 4A illustrates a perspective view of a funnel shaped passageway within a centertube, according to one embodiment.
Figure 4B:
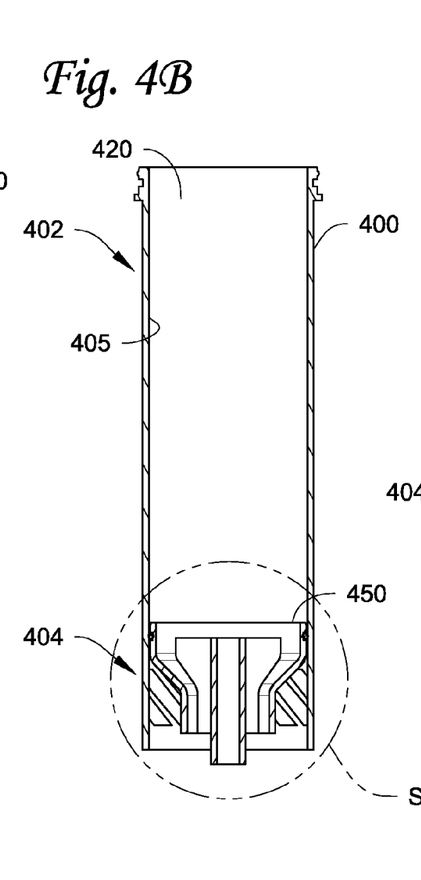
FIG. 4B illustrates a cross-sectional side view of a funnel shaped passageway within a centertube, according to one embodiment.
Figure 4C:
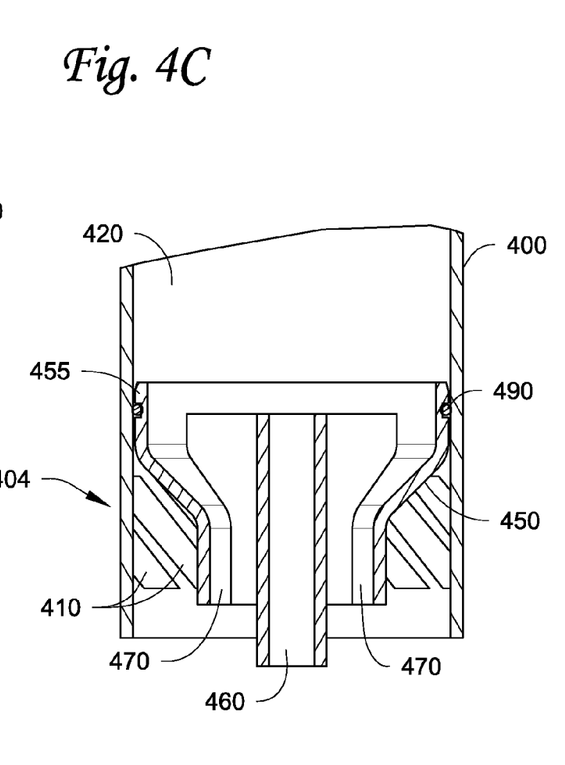
FIG. 4C illustrates a zoomed-in view of the funnel shaped passageway within the centertube shown in FIG. 4B.

FIGS. 4A-4C provide different views of a funnel shaped passageway 450 attached to an interior wall 405 of a centertube 400. The interior wall 405 defines an interior space 420 for housing a filter element (not shown) and the funnel shaped passageway 450. The centertube 400 includes a top section 402 and a bottom section 404. The funnel shaped passageway 450 includes a top connection portion 455 that is attached to the interior wall 405 near a bottom of the top section 402. The funnel shaped passageway 450 also includes a central flow passage 460 and a plurality of perimeter flow passages 470.

The bottom section 402 includes a plurality of first fluid flow passages 410 that allows a first fluid (not shown) to pass through the centertube 400. When an outer filter element (not shown) is disposed around the centertube 400, the first fluid is able to enter or exit the outer filter element via the first fluid flow passages 410 without coming into contact with a second fluid (not shown) passing through the central flow passage 460 or the perimeter flow passages 470.

When an inside-out filter element (not shown) is disposed within the top section 402 of the centertube 400, the second fluid is able to enter a filter assembly (not shown) and pass through the inside-out filter element via central flow passage 460. The second fluid is then able to exit the filter assembly via the perimeter flow passages 470. When an outside-in filter element (not shown) is disposed within the top section 402 of the centertube 400, a second fluid is able to enter a filter assembly (not shown) and pass through the inside-out filter element via perimeter flow passages 470. The second fluid is then able to exit the filter assembly via the central flow passage 460.

A seal 490 is provided between the top connection portion 455 of the funnel shaped passageway 450 and the interior wall 405 to prevent the first fluid from entering the interior space 420 above the funnel shaped passageway 450 and to prevent second fluid from exiting the centertube 400 without passing through the central flow passage 460 or the perimeter flow passages 470.

Figure 5A:
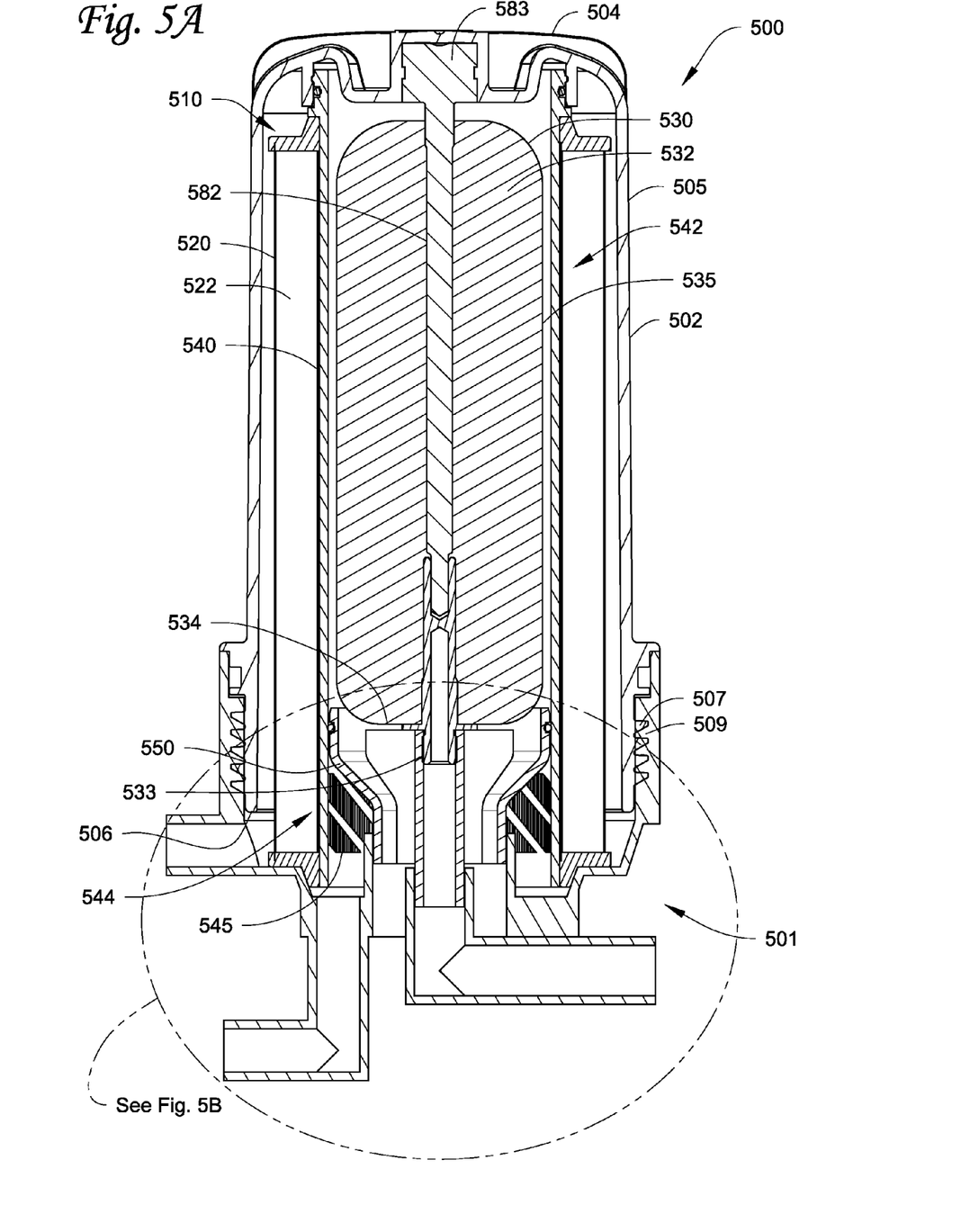
FIG. 5A illustrates a cross-sectional side view of a filter assembly attached to a filter system, according to one embodiment.
Figure 5B:
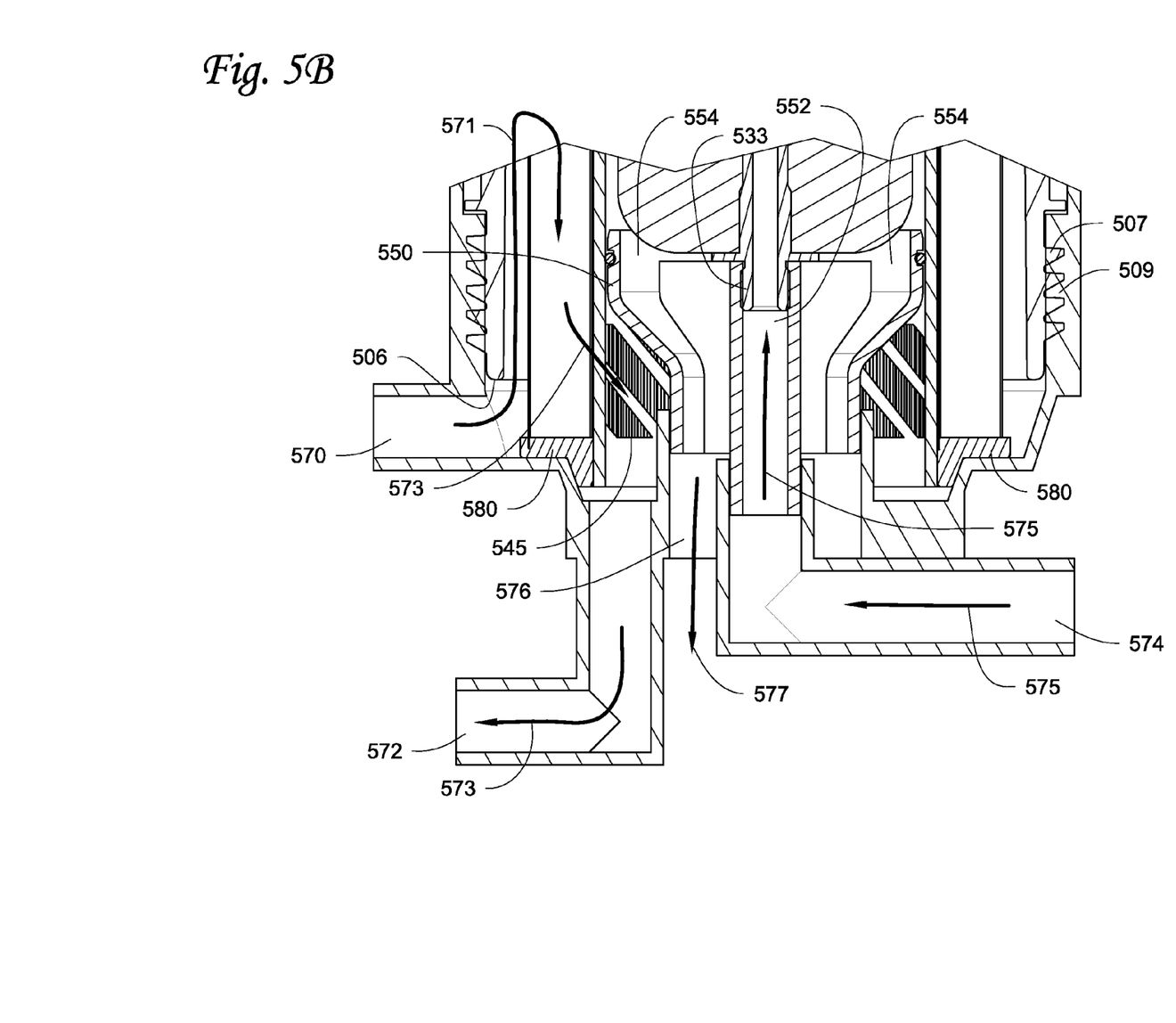
FIG. 5B illustrates a zoomed-in view of the filter assembly attached to the filter system shown in FIG. 5A.

FIGS. 5A and 5B provide cross-sectional side views of one embodiment of a filter assembly 500 attached to a filter system 501. The filter assembly 500 includes a generally cylindrical housing or shell 505 for housing a replaceable parallel flow filter-in-filter filter cartridge 510. The shell 505 has a generally cylindrical wall 502, a closed top end 504 and an open bottom end 506 for attaching the assembly 500. The filter cartridge 510 is attached to the top end 504 of the shell 505. The shell 505 includes a thread fitting 507 for attaching the shell 505 to a thread fitting 509 of the filter system 501. The thread fittings 507, 509 can use, for example, a fine thread pitch, a buttress thread pitch, etc.

The filter cartridge 510 includes a first outer filter element 520 radially spaced apart from a second inner filter element 530. The first outer filter element 520 includes a filter media 522 and the second inner filter element 530 includes a centrifuge 532. The filter cartridge 510 also includes a centertube 540 and a funnel shaped passageway 550. The centertube 540 is provided between the filter media 522 and the centrifuge 532. The funnel shaped passageway 550 is disposed within the centertube 540 and generally below the centrifuge 532. As shown in FIG. 5B, the centrifuge 532 includes a fluid port 533 that fits within the central flow passage 552.

The centertube 540 includes a top section 542 and a bottom section 544. The bottom section 544 includes a plurality of flow passages 545. The flow passages 545 are formed as downwardly spiraling slots. The funnel shaped passageway 550 is provided within the centertube 540. As shown in FIG. 5B, the funnel shaped passageway 550 includes a central flow passage 552 and a plurality of perimeter flow passages 554.

The filter assembly 500 also includes a multiple segment slip fit shaft 582 that extends from the top end 504 through a bottom end 534 of the centrifuge 532 and into the port 533. The shaft 582 includes an insert 583 that attaches to the top end 504. In some embodiments the insert 583 is molded into the top end 504.

The filter cartridge 510 and the filter system 501 are configured to allow the central flow passage 552 to fit within a second fluid entry passageway 574 and allow a bottom portion 580 of the first outer filter element 520 and a bottom end of the centertube 540 to rest within the filter system 501.

The filter system 501 includes a first fluid entry passageway 570 for allowing a first fluid (not shown) to enter the filter assembly 500 and pass through the first outer filter element 520, and a first fluid exit passageway 572 for allowing the first fluid filtered by the first outer filter element 520 to exit the filter assembly 500.

Arrow 571 generally shows the flow path of the first fluid from the first fluid entry passageway 570, up through the open end 506 of the shell 505 and then through the filter media 522. Arrows 573 generally show the flow path of the first fluid passing through the filter media 522, through the flow passages 545 into the bottom section 544 of the centertube 540 and out of the filter assembly 500 via the first fluid exit passageway 572.

The filter system 501 also includes the second fluid entry passageway 574 for allowing a second fluid (not shown) to enter the filter assembly 500 and be filtered by the second inner filter element 530, and a second fluid exit passageway 576 for allowing the second fluid filtered by the second outer filter element 530 to exit the filter assembly 500. Arrows 575 generally show the flow path of the second fluid from the second fluid entry passageway 574, up through the central flow passage 552 of the funnel shaped passageway 550 and then into an interior of the centrifuge 532. Arrow 577 generally shows the flow path of the second fluid exiting the centrifuge 532 via the perimeter flow passages 554 and out of the filter assembly 500 via the second fluid exit passageway 576.

In the embodiment shown in FIGS. 5A and 5B, the first outer filter element 520 is an outside-in filter element.

Accordingly, the filter system 501 is configured to allow the first fluid to enter the filter assembly 500 via the first fluid entry passageway 570 and allow the first fluid to exit the filter assembly 500 via the first fluid exit passageway 572.

In other embodiments, the first outer filter element 520 is an inside-out filter element. In these embodiments, the filter system 501 is configured to allow the first fluid to enter the filter assembly 500 via the first fluid exit passageway 572 and allow the first fluid to exit the filter assembly 500 via the first fluid exit passageway 570.

Also, in the embodiment shown in FIGS. 5A and 5B, the second inner filter element 530 is configured to allow the second fluid to enter the centrifuge 532 via the fluid port 533 and exit the centrifuge 532 via an outlet (not shown) along a side wall 535 of the centrifuge 532. Accordingly, the filter system 501 is configured to allow the second fluid to enter the filter assembly 500 via the second fluid entry passageway 574 which is in fluid communication with the central flow passage 552 and thereby the fluid port 533. The filter system 501 is also configured to allow the second fluid to exit the filter assembly 500 via the second fluid exit passageway 576 which is in fluid communication with the perimeter flow passages 554 and the outlet of the centrifuge 532.

In other embodiments, the fluid port 533 is configured as an outlet of the centrifuge 532 and the filter system 501 is configured to allow the second fluid to exit the filter assembly via second fluid entry passageway 574 which is in fluid communication with the central flow passage 552. The filter system 501 is also configured to allow the second fluid to enter the filter assembly 500 via the second fluid exit passageway 576 which is in fluid communication with the perimeter flow passages 554 and an inlet of the centrifuge 532.

Figure 6A:
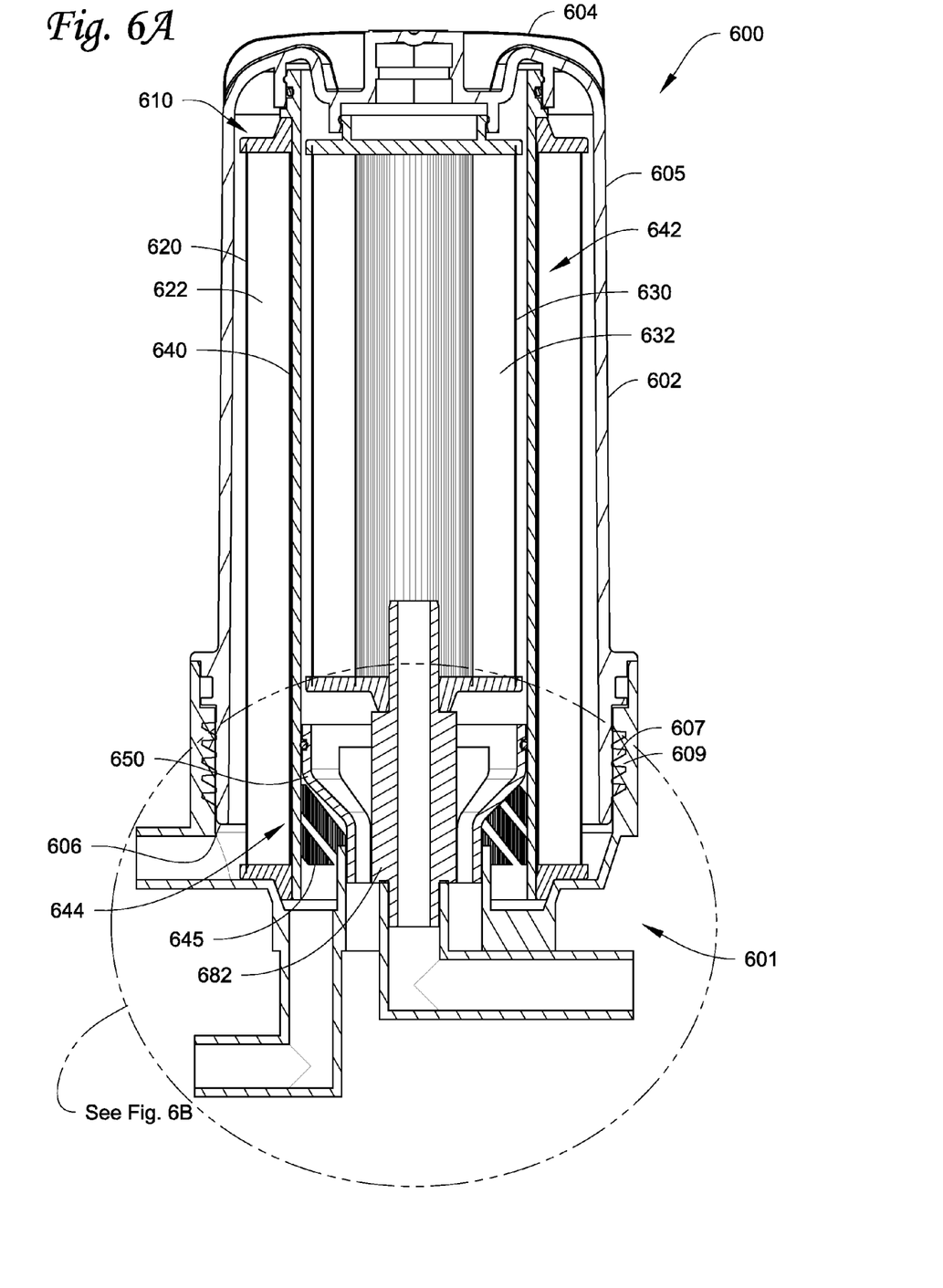
FIG. 6A illustrates a cross-sectional side view of a filter assembly attached to a filter system, according to another embodiment.
Figure 6B:
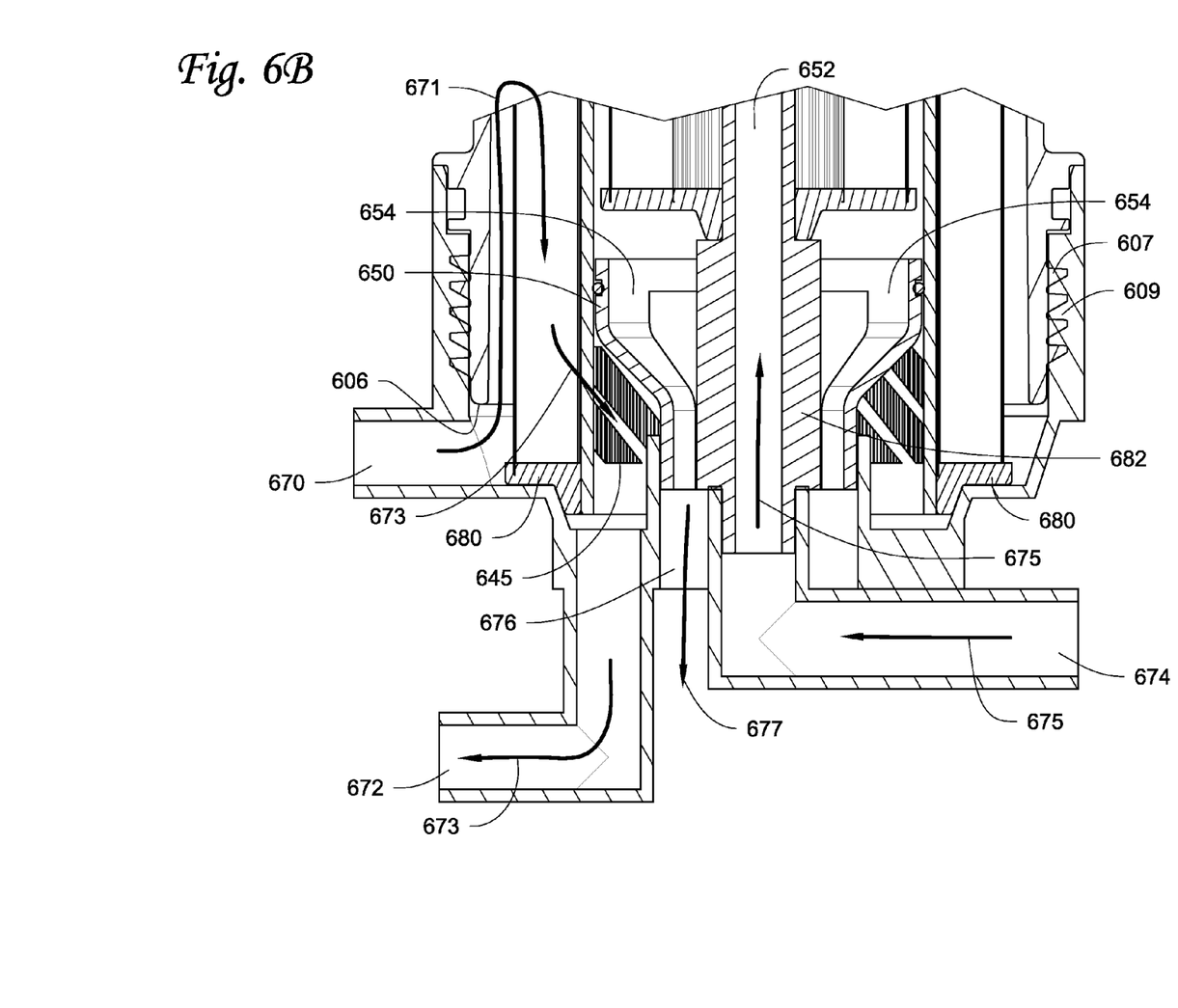
FIG. 6B illustrates a zoomed-in view of the filter assembly attached to the filter system shown in FIG. 6A.

FIGS. 6A and 6B provide cross-sectional side views of another embodiment of a filter assembly 600 attached to a filter system 601. The filter assembly 600 includes a generally cylindrical housing or shell 605 for housing a replaceable parallel flow filter-in-filter filter cartridge 610. The shell 605 has a generally cylindrical wall 602, a closed top end 604 and an open bottom end 606 for attaching the assembly 600. The filter cartridge 610 is attached to the top end 604 of the shell 605. The shell 605 includes a thread fitting 607 for attaching the shell 605 to a thread fitting 609 of the filter system 601. The thread fittings 607, 609 can use, for example, a fine thread pitch, a buttress thread pitch, etc.

The filter cartridge 610 includes a first outer filter element 620 radially spaced apart from a second inner filter element 630. The first outer filter element 620 includes a first fluid filter media 622 and the second inner filter element 630 includes a second fluid filter media 632. The filter cartridge 610 also includes a centertube 640 and a funnel shaped passageway 650. The centertube 640 is provided between the first fluid filter media 622 and the second fluid filter media 632. The funnel shaped passageway 650 is disposed within the centertube 640 and generally below the second fluid filter media 632.

The centertube 640 includes a top section 642 and a bottom section 644. The bottom section 644 includes a plurality of flow passages 645. The flow passages 645 are formed as downwardly spiraling slots. As shown in FIG. 6B, the funnel shaped passageway 650 includes a central flow passage 652 and a plurality of perimeter flow passages 654.

The filter assembly 600 also includes a port 682 that extends from within an interior of the second fluid filter media 632, through the central flow passage 652 and into a second fluid entry passage 674 of the filter system 601.

The filter cartridge 610 and the filter system 601 are configured to allow the central flow passage 652 and the port 682 to fit within the second fluid entry passageway 674 and allow a bottom portion 680 of the first outer filter element 620 and a bottom end of the centertube 640 to rest within the filter system 601.

The filter system 601 includes a first fluid entry passageway 670 for allowing a first fluid (not shown) to enter the filter assembly 600 and pass through the first outer filter element 620, and a first fluid exit passageway 672 for allowing the first fluid filtered by the first outer filter element 620 to exit the filter assembly 600.

Arrow 671 generally shows the flow path of the first fluid from the first fluid entry passageway 670, up through the open end 606 of the shell 605 and then through the first fluid filter media 622. Arrows 673 generally show the flow path of the first fluid passing through the first fluid filter media 622, through the flow passages 645 into the bottom section 644 of the centertube 640 and out of the filter assembly 600 via the first fluid exit passageway 672.

The filter system 601 also includes the second fluid entry passageway 674 for allowing a second fluid (not shown) to enter the filter assembly 600 and be filtered by the second inner filter element 630, and a second fluid exit passageway 676 for allowing the second fluid filtered by the second outer filter element 630 to exit the filter assembly 600. Arrows 675 generally show the flow path of the second fluid from the second fluid entry passageway 674, then up through the central flow passage 652 of the funnel shaped passageway 650 and then into an interior of the second fluid filter media 632 via the port 682. Arrow 677 generally shows the flow path of the second fluid exiting the second fluid filter media 632 via the perimeter flow passages 654 and out of the filter assembly 600 via the second fluid exit passageway 676.

In the embodiment shown in FIGS. 6A and 6B, the first outer filter element 620 is an outside-in filter element. Accordingly, the filter system 601 is configured to allow the first fluid to enter the filter assembly 600 via the first fluid entry passageway 670 and allow the first fluid to exit the filter assembly 600 via the first fluid exit passageway 672.

In other embodiments, the first outer filter element 620 is an inside-out filter element. In these embodiments, the filter system 601 is configured to allow the first fluid to enter the filter assembly 600 via the first fluid exit passageway 672 and allow the first fluid to exit the filter assembly 600 via the first fluid exit passageway 670.

Also, in the embodiment shown in FIGS. 6A and 6B, the second inner filter element 630 is an inside-out filter element. Accordingly, the filter system 601 is configured to allow the second fluid to enter the filter assembly 600 from the second fluid entry passageway 674 via the port 682 and allow the second fluid to exit the filter assembly 600 via the perimeter flow passages 654. Accordingly, the filter system 601 is configured to allow the second fluid to enter the filter assembly 600 via the second fluid entry passageway 674 which is in fluid communication with the central flow passage 652 and thereby the port 682. The filter system 601 is also configured to allow the second fluid to exit the filter assembly 600 via the second fluid exit passageway 676 which is in fluid communication with the perimeter flow passages 654.

In other embodiments, the port 682 is configured as an outlet of the filter assembly 600 and the filter system 601 is configured to allow the second fluid to exit the filter assembly via second fluid entry passageway 674. The filter system 601 is also configured to allow the second fluid to enter the filter assembly 600 via the second fluid exit passageway 676 which is in fluid communication with the perimeter flow passages 654.

The inventive concepts disclosed herein may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A filter-in-filter fluid filter cartridge comprising:
a first filter element;
a second filter element radially spaced apart from the first filter element;
a centertube positioned between the first filter element and the second filter element, the centertube having a cylindrical side wall and first and second open ends at opposite ends of the cylindrical side wall, the cylindrical side wall including a solid top portion that extends along a length of the second filter element and a bottom portion that includes a plurality of centertube flow passages that is adjacent the second open end and generally below the second filter element, the solid top portion being formed without openings to prevent fluid communication between the first filter element and the second filter element;
a funnel passageway attached to an interior surface of the cylindrical side wall of the centertube above the bottom portion, the funnel passageway including a central flow passage and a plurality of perimeter funnel flow passages fluidly isolated from the central flow passage;
wherein a first fluid is configured to pass through the first filter element and the centertube flow passages and the second fluid is configured to pass through the second filter element, the central passageway and the perimeter funnel flow passages without contacting the first fluid.

2. The filter-in-filter fluid filter cartridge of claim 1, wherein an exterior surface of the cylindrical side wall includes a plurality of ridges that hold off the first filter element.

3. The filter-in-filter fluid filter cartridge of claim 1, wherein the plurality of centertube flow passages are shaped as downwardly spiraling slots.

4. The filter-in-filter fluid filter cartridge of claim 1, wherein the funnel passageway also includes a funnel connection portion located at a top end of the funnel passageway, the funnel connection portion attached to the interior surface of the cylindrical side wall of the centertube above the bottom portion, the funnel connection portion having a first thread fitting configured to allow the funnel passageway to attach to an interior surface of the cylindrical side wall of the centertube, and
wherein the filter-in-filter fluid filter also includes a first seal provided between the funnel connection portion and the interior surface of the cylindrical side wall of the centertube, the seal configured to ensure that a fluid within the top section of the centertube exits the second end of the centertube by passing through the funnel passageway.

5. The filter-in-filter fluid filter cartridge of claim 2, wherein the plurality of ridges are downwardly spiraling ridges.

6. The filter-in-filter fluid filter cartridge of claim 1, wherein the funnel passageway includes a plurality of ribs, each of the ribs extending from the central flow passage to an interior wall of the funnel passageway to secure the central flow passage to the interior wall of the funnel passageway.

7. The filter-in-filter fluid filter cartridge of claim 1, wherein the cylindrical wall also includes a centertube connection portion located above the solid top portion and adjacent the first open end, the centertube connection portion having a second thread fitting to attach the filter-in-filter fluid filter cartridge to the housing, and
wherein the filter-in-filter fluid filter cartridge also includes a second seal provided between the centertube connection portion and a housing for the filter-in-filter fluid filter cartridge to secure the filter-in-filter fluid filter cartridge to the housing.

8. The filter-in-filter fluid filter cartridge of claim 1, wherein the inner filter element includes a centrifuge.

9. The filter-in-filter fluid filter cartridge of claim 1, wherein the inner filter element is a filter media type filter element.

10. The filter-in-filter fluid filter cartridge of claim 1, wherein the outer filter element is one of a depth filter media, a pleated filter media, a multi-layer filter media, or a combined cleaning unit drain assembly.

11. A centertube and funnel drain combination for use in a filter-in-filter fluid filter assembly, the centertube and funnel combination including:
a centertube configured to be positioned between an outer filter element and an inner filter element, the centertube including a cylindrical side wall and first and second open ends at opposite ends of the cylindrical side wall, the cylindrical side wall including a solid top section configured to extend along a length of the inner filter element and a bottom section adjacent the second open end that includes a plurality of centertube flow passages, the solid top section being formed without openings to prevent fluid communication between the outer filter element and the inner filter element; and
a funnel drain attached to the centertube above the bottom section, the funnel drain including a central flow passage configured to allow a first fluid to pass through the funnel drain and a plurality of perimeter funnel flow passages configured to allow a second fluid to pass through the funnel drain without contacting the first fluid.

12. The centertube and funnel drain combination of claim 11, wherein an exterior surface of the cylindrical side wall includes a plurality of ridges configured to hold off the outer filter element.

13. The centertube and funnel drain combination of claim 11, wherein the plurality of centertube flow passages are shaped as downwardly spiraling slots.

14. The centertube and funnel drain combination of claim 11, wherein the funnel drain also includes a funnel connection section at a top end of the funnel drain, the funnel connection section having a first thread fitting configured to allow the funnel drain to attach to an interior surface of the cylindrical side wall of the centertube above the bottom section, and
wherein the centertube and funnel drain combination further includes a seal provided between the top funnel connection section and the interior surface of the cylindrical side wall of the centertube, the seal configured to ensure that a fluid within the top section of the centertube exits the second end of the centertube by passing through the funnel drain.

15. The centertube and funnel combination of claim 12, wherein the plurality of ridges are downwardly spiraling ridges.

16. The centertube and funnel combination of claim 11, wherein the funnel drain includes a plurality of side plates, each of the side plates extending from the central flow passage to an interior wall of the funnel drain to secure the central flow passage to the interior wall of the funnel drain.

17. The centertube and funnel combination of claim 11, wherein the cylindrical side wall also includes a centertube connection section located above the solid top section and adjacent the first open end, the centertube connection section having a second thread fitting configured to allow the centertube and funnel drain combination to attach to a housing of the filter-in-filter fluid filter assembly.

18. A method for filtering a first fluid and a second fluid through independent flow paths of a filter-in-filter fluid filter cartridge such that the first fluid and the second fluid are not in fluid communication, the method comprising:
    directing the first fluid through an outer filter element, a plurality of centertube flow passages on a cylindrical side wall of a centertube positioned between the outer filter element and an inner filter element radially spaced apart from the inner filter element;
    directing the second fluid through an inner filter element, a central flow passage of a funnel drain attached to a bottom section of the cylindrical side wall, and a perimeter flow passage of the funnel drain that is fluidly isolated from the central flow passage.

\* \* \* \* \*